US012400614B1

(12) United States Patent
Yang et al.

(10) Patent No.: US 12,400,614 B1
(45) Date of Patent: Aug. 26, 2025

(54) DISPLAY APPARATUS AND COMPENSATING METHOD OF IMAGE DATA

(71) Applicant: Novatek Microelectronics Corp., Hsinchu (TW)

(72) Inventors: Chuang-Cheng Yang, Hsinchu County (TW); Wen-Chin Cheng, Hsinchu County (TW); Hsiao I Kuo, Hsinchu (TW); Chun-Hung Lin, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/677,904

(22) Filed: May 30, 2024

Related U.S. Application Data

(60) Provisional application No. 63/557,580, filed on Feb. 25, 2024.

(51) Int. Cl.
*G09G 3/36* (2006.01)

(52) U.S. Cl.
CPC ... *G09G 3/3614* (2013.01); *G09G 2320/0247* (2013.01)

(58) Field of Classification Search
CPC ............... G09G 3/3614; G09G 3/3688; G09G 2310/08; G09G 2320/0204
See application file for complete search history.

(56) References Cited

U.S. PATENT DOCUMENTS 6,232,944 B1 * 5/2001 Kumagawa .......... G09G 3/3696 345/94
8,907,936 B2 12/2014 Mizusako
9,343,017 B2 5/2016 Yamada
9,697,783 B2 * 7/2017 Yeo ...................... G09G 3/3614
10,276,109 B2 4/2019 Crounse et al.
10,732,444 B2 8/2020 Chida
2008/0309656 A1 * 12/2008 Van Woudenberg ........................ G09G 3/3614 345/87
2010/0042866 A1 * 2/2010 Shih .......................... G06F 1/12 713/600
2010/0073341 A1 * 3/2010 Toyooka .............. G09G 3/3614 345/55
2010/0309183 A1 12/2010 Mizusako
2011/0216100 A1 9/2011 Yamada
2014/0085345 A1 * 3/2014 Ma ....................... G09G 3/3655 345/89
2017/0263175 A1 9/2017 Crounse et al.
(Continued)

FOREIGN PATENT DOCUMENTS

CN 101908302 12/2010
CN 102194415 9/2011
(Continued)

OTHER PUBLICATIONS

"Office Action of Taiwan Counterpart Application", issued on Apr. 16, 2025, p. 1-p. 5.

*Primary Examiner* — Van N Chow
(74) *Attorney, Agent, or Firm* — JCIPRNET

(57) ABSTRACT

A compensating method of image data is provided. The compensating method includes: calculating a polarity accumulation time of a positive polarity and a negative polarity of the image data; and determining whether to compensate a voltage polarity of the image data according to the polarity accumulation time.

18 Claims, 4 Drawing Sheets

(56) References Cited

U.S. PATENT DOCUMENTS

| | | | | |
|---|---|---|---|---|
| 2017/0358255 | A1 * | 12/2017 | Wang | G09G 3/2055 |
| 2019/0228717 | A1 | 7/2019 | Crounse et al. | |
| 2019/0310502 | A1 | 10/2019 | Chida | |
| 2020/0175930 | A1 * | 6/2020 | Koo | G09G 3/3614 |
| 2021/0327327 | A1 | 10/2021 | Fujikawa | |

FOREIGN PATENT DOCUMENTS

| | | |
|---|---|---|
| CN | 109074781 | 12/2018 |
| CN | 110121743 | 8/2019 |
| CN | 113763901 | 12/2021 |

* cited by examiner

DISPLAY APPARATUS AND COMPENSATING METHOD OF IMAGE DATA

CROSS-REFERENCE TO RELATED APPLICATION

This application claims the priority benefit of U.S. Provisional application Ser. No. 63/557,580, filed on Feb. 25, 2024. The entirety of the above-mentioned patent application is hereby incorporated by reference herein and made a part of this specification.

BACKGROUND

Technical Field

The invention relates to an electronic device and a compensating method, more specifically, to a display apparatus and a compensating method of an image data.

Description of Related Art

In a normal display, each pixel of a liquid crystal display (LCD) panel should switch between positive and negative frames. However, if the LCD panels stay in a single polarity for a long period, it may result in impurity ions in the LCD panels interfering with the electric field under the influence of direct current (DC) bias, thereby causing flicker.

The timing of the LCD apparatus is defined by the front-end system. The timing controller is part of the receiving end. In the normal display, the timing controller receives timing information from the front-end system. In a scenario where even frames are longer than odd frames, the LCD apparatus will flicker more, and vice versa.

SUMMARY

The invention is directed to a display apparatus and a compensating method of an image data, capable of improving display quality.

The invention provides a compensating method of image data including: calculating a polarity accumulation time of a positive polarity and a negative polarity of the image data; and determining whether to compensate a voltage polarity of the image data according to the polarity accumulation time.

The invention provides a display apparatus including a display panel and a driver circuit. The display panel is configured to display images according to image data. The driver circuit is coupled to the display panel. The driver circuit is configured to output the image data to drive the display panel to display the images. The driver circuit is further configured to calculate a polarity accumulation time of a positive polarity and a negative polarity of the image data, and determine whether to compensate a voltage polarity of the image data according to the polarity accumulation time.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term “coupling/coupled” or “connecting/connected” used in this specification (including claims) of the application may refer to any direct or indirect connection means. For example, “a first device is coupled to a second device” should be interpreted as “the first device is directly connected to the second device” or “the first device is indirectly connected to the second device through other devices or connection means.” In addition, the term “signal” can refer to a current, a voltage, a charge, a temperature, data, electromagnetic wave or any one or multiple signals.

Figure 1:
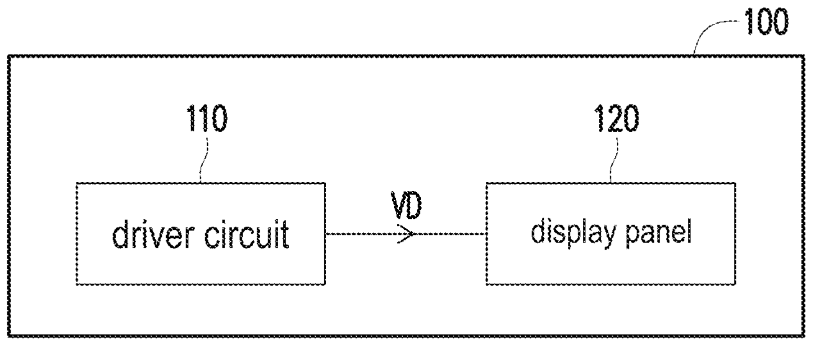
FIG. 1 is a schematic block diagram illustrating a display apparatus according to an embodiment of the invention.
Figure 2:
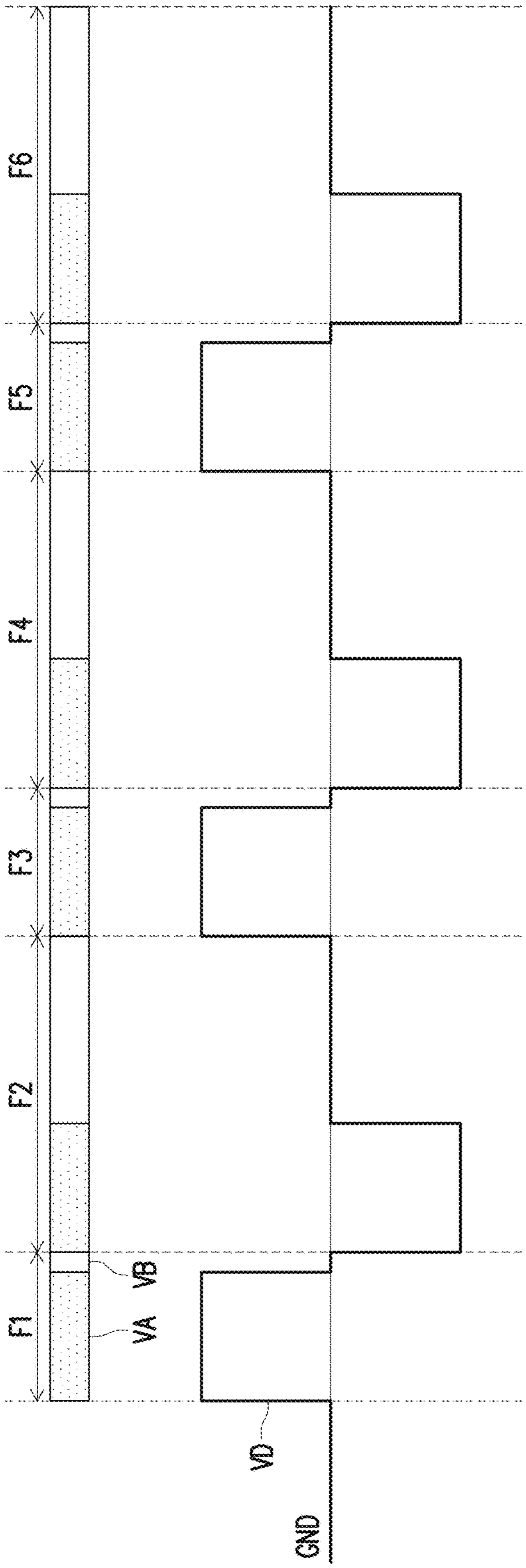
FIG. 2 is a waveform diagram of image data according to an embodiment of the invention.

FIG. 1 is a schematic block diagram illustrating a display apparatus according to an embodiment of the invention. FIG. 2 is a waveform diagram of image data according to an embodiment of the invention. Referring to FIG. 1 and FIG. 2, the display apparatus 100 includes a driver circuit 110 and a display panel 120. The display panel 120 is configured to display images according to the image data VD. The driver circuit 110 is coupled to the display panel 120. The driver circuit 110 is configured to output the image data VD to drive the display panel 120 to display the images in a plurality of image frames F1 to F6. The waveform diagram of the image data VD is illustrated in FIG. 2. The image data VD is an image data for driving a specified pixel of display panel 120.

Each of the image frames F1 to F6 includes an active period VA and a blanking period VB. The image data VD has a voltage of a positive polarity in the image frames F1, F3 and F5. The image data VD has a voltage of a negative polarity in the image frames F2, F4 and F6. The polarities of the voltage alternatively distribute in the image frames F1 to F6. In the present embodiment, the image frames F1, F3 and F5 with the positive polarity is short than the image frames F2, F4 and F6 with the negative polarity, but the invention is not limited thereto. In other embodiments, the image frames F1, F3 and F5 with the positive polarity may be longer than or equal to the image frames F2, F4 and F6 with the negative polarity.

In the present embodiment, the driver circuit 110 may be a display driver integrated circuit (DDIC), and include a timing controller and a source driver integrated in a single circuit chip, but the invention is not limited thereto. In other embodiments, the timing controller and the source driver may be disposed in different driver circuits. In addition, enough teaching, suggestion, and implementation illustration for the hardware structures of the driver circuit 110 and the display panel 120 can be obtained with reference to common knowledge in the related art, which is not repeated hereinafter.

Figure 3:
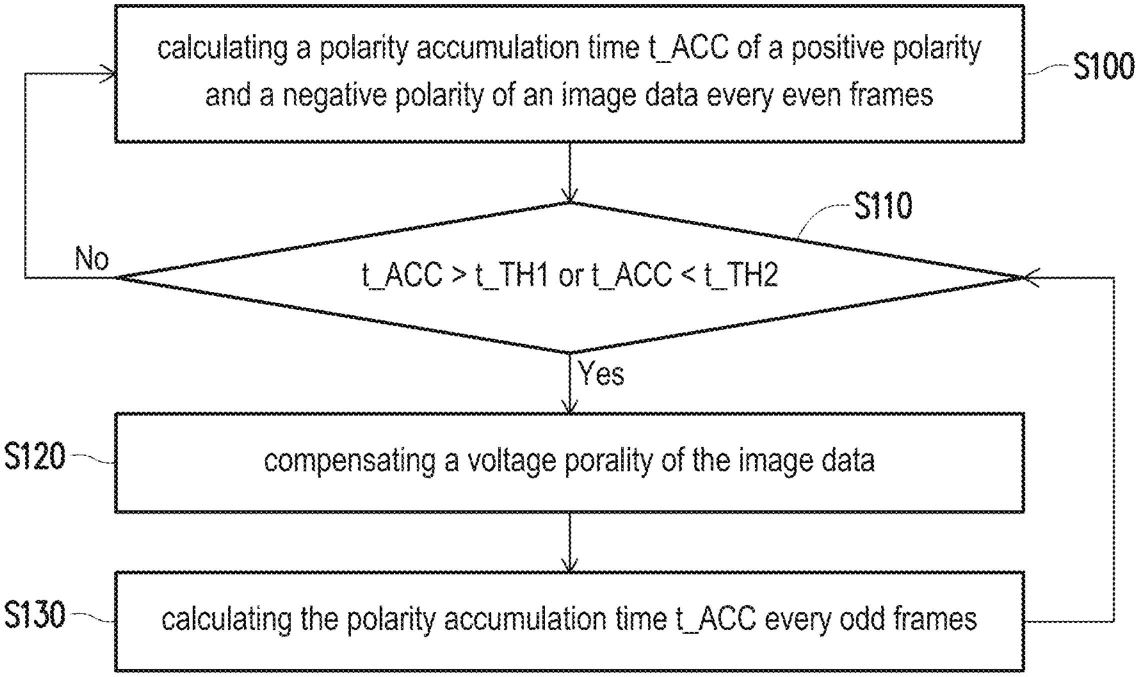
FIG. 3 is a flowchart illustrating steps in the compensating method of the image data according to an embodiment of the invention.
Figure 4:
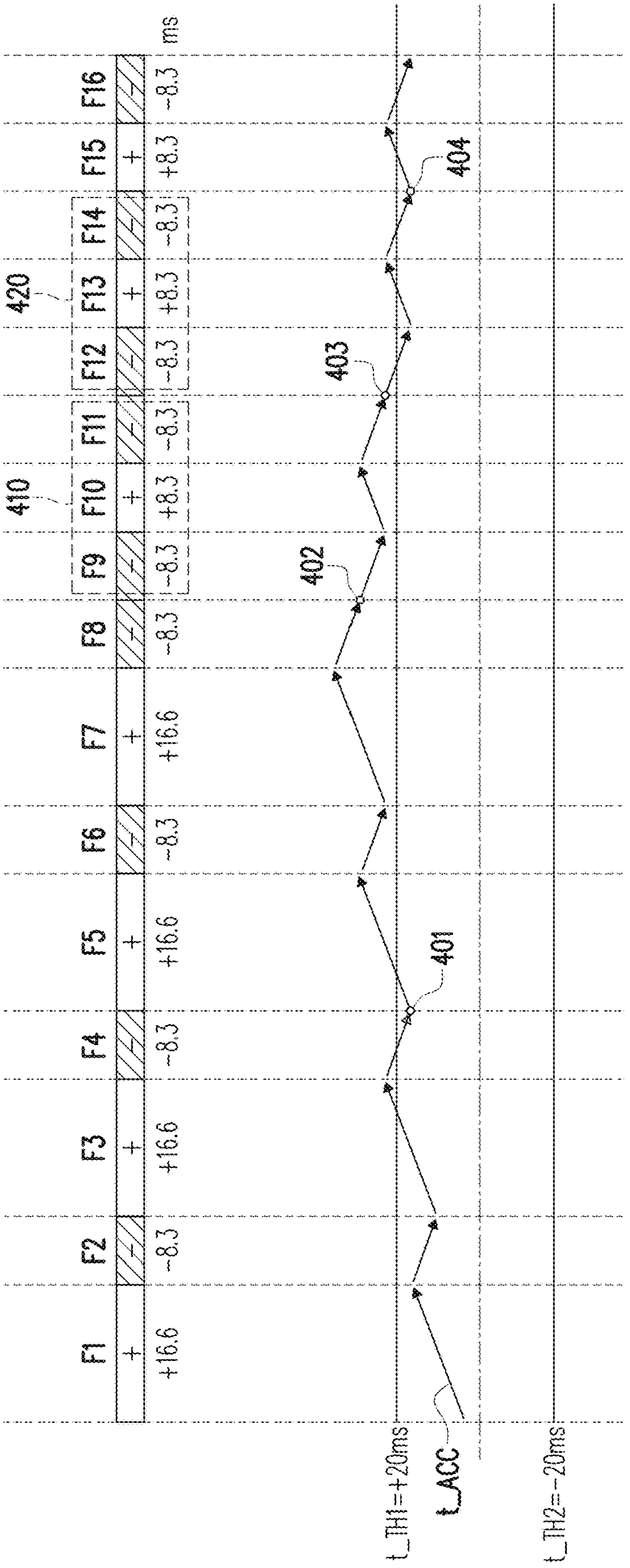
FIG. 4 is a schematic diagram illustrating a polarity accumulation time changing along with image frames according to an embodiment of the invention.

In the disclosure, the driver circuit 110 may perform a compensating method on the image data VD to avoid flicker of the display panel 120. To be specific, FIG. 3 is a flowchart illustrating steps in the compensating method of the image data according to an embodiment of the invention. FIG. 4 is a schematic diagram illustrating a polarity accumulation time changing along with image frames according to an embodiment of the invention.

Referring to FIG. 3 and FIG. 4, the image frames F1, F3, F5, F7, F10, F13 and F15 marked as plus sign "+" indicate that these image frames have the positive polarity (hereinafter "the positive frames"), and the image frames F2, F4, F6, F8, F9, F11, F12, F14 and F16 marked as minus sign "−" indicate that these image frames have the negative polarity (hereinafter "the negative frames"). The time length of the positive frames F1, F3, F5 and F7 before compensation is 16.6 milliseconds, and the time length of the negative frames F2, F4, F6 and F8 before compensation is 8.3 ms. The time length of the frames is taken for example, and does not intend to limit the invention.

In step S100, the driver circuit 110 calculates a polarity accumulation time t_ACC of the positive polarity and the negative polarity of the image data VD every even frames before compensation. In FIG. 4, the driver circuit 110, for example, calculates the polarity accumulation time t_ACC every four frames before compensation, but the invention is not limited thereto. For example, the positive frames F1 and F3 each have a time length of 16.6 ms, and the negative frames F2 and F4 each have a time length of 8.3 ms. For accumulation calculation, the time length of the negative frames F2 and F4 is considered as a negative value, and thus at point 401, the polarity accumulation time t_ACC is calculated as 16.6 ms. Therefore, the polarity accumulation time t_ACC indicates a time difference of the positive polarity and the negative polarity of the image data VD.

In step S110, the driver circuit 110 determines whether to compensate a voltage polarity of the image data VD according to the polarity accumulation time t_ACC. When the polarity accumulation time t_ACC is smaller than or equal to the first threshold value t_TH1, the driver circuit 110 does not compensate the voltage polarity of the image data VD. Alternatively, when the polarity accumulation time t_ACC is larger than or equal to the second threshold value t_TH2, the driver circuit 110 also does not compensate the voltage polarity of the image data VD, wherein the second threshold value t_TH2 is smaller than the first threshold value t_TH1. In this case, the first threshold value t_TH1 is set as 20 ms, and the second threshold value t_TH1 is set as −20 ms, but the invention is not limited thereto.

At point 401, since the polarity accumulation time t_ACC is calculated as 16.6 ms and smaller than the first threshold value t_TH1, i.e. 16.6 ms<20 ms, the driver circuit 110 determines not to compensate the voltage polarity of the image data VD. The driver circuit 110 returns to step S100 and continues to calculate the polarity accumulation time t_ACC every four frames. The polarity accumulation time t_ACC is not reset.

Next, at point 402, the polarity accumulation time t_ACC is calculated as 33.2 ms, which is larger than the first threshold value t_TH1. When the polarity accumulation time t_ACC is larger than the first threshold value t_TH1, the driver circuit 110 compensates the voltage polarity of the image data VD in a first polarity pattern. Alternatively, when the polarity accumulation time t_ACC is smaller than a second threshold value t_TH2, the driver circuit 110 compensates the voltage polarity of the image data VD in a second polarity pattern.

Table 1 shows the polarity distribution of the first polarity pattern and the second polarity pattern.

TABLE 1

| | polarity pattern | polarity distribution |
|---|---|---|
| t_ACC > t_TH1 | first polarity pattern | −+−<br>+−−<br>−−+ |
| t_ACC < t_TH2 | second polarity pattern | +−+<br>−++<br>++− |

The expression t_ACC>t_TH1 indicates that the polarity accumulation time t_ACC of the positive frames is too long, and thus, the negative polarity compensation is required. The first polarity pattern is adopted for the negative polarity compensation. The first polarity pattern includes at least two frames of the negative polarity.

The expression t_ACC<t_TH2 indicates that the polarity accumulation time t_ACC of the negative frames is too long, and thus, the positive polarity compensation is required. The second polarity pattern is adopted for the positive polarity compensation. The second polarity pattern includes at least two frames of the positive polarity.

In the disclosure, each of the first polarity pattern and the second polarity pattern has time length of odd frames. Table 1 shows each of the first polarity pattern and the second polarity pattern has time length of three frames as an example, and the invention is not limited thereto.

At point 402, since the polarity accumulation time t_ACC is calculated as 33.2 ms and larger than the first threshold value t_TH1, i.e. 33.2 ms>20 ms, the driver circuit 110 determines to compensate the voltage polarity of the image data VD. The driver circuit 110 performs step S120 and compensates the voltage polarity of the image data VD in the first polarity pattern.

In step S120, the driver circuit 110 selects one polarity distribution "−+−" of the first polarity pattern 410 to compensate the voltage polarity of the image data VD. As illustrated in FIG. 4, starting from point 402, the voltage polarity of the image data VD is compensated using the first polarity pattern 410. The frames F9, F10 and F11 are respectively the negative frame, the positive frame and the negative frame, and have the same time length 8.3 ms, but the invention is not limited thereto.

After compensation, the driver circuit 110 goes to step S130, and calculates the polarity accumulation time t_ACC every odd frames, e.g. every three frames in this case. At point 403, since the polarity accumulation time t_ACC is calculated as 24.9 ms, and still larger than the first threshold value t_TH1, i.e. 24.9 ms>20 ms, the driver circuit 110 performs step S120 again, and compensates the voltage polarity of the image data VD in the first polarity pattern 420.

Next, at point 404, the polarity accumulation time t_ACC is calculated as 16.6 ms, and smaller than the first threshold value t_TH1, i.e. 16.6 ms<20 ms. The driver circuit 110 stops compensating the voltage polarity of the image data VD, and returns to step S100 from step S110. That is to say, when the polarity accumulation time t_ACC is between the first threshold value t_TH1 and the second threshold value t_TH2, the driver circuit 110 stops compensating the voltage polarity of the image data VD. In addition, the polarity accumulation time t_ACC is calculated every odd frames after compensation until the compensation is ended.

In summary, in the embodiments of the invention, the driver circuit calculates the polarity accumulation time every even frames, and sets threshold values for compensation. When the polarity compensation is required, the driver circuit compensates the voltage polarity of the image data in the specified polarity pattern, and calculates the polarity accumulation time every odd frames until the compensation is ended. Consequently, the voltage polarity of the image data is compensated in order to prevent the occurrence of flicker on the display panel. This results in the display apparatus being able to provide a high-quality display.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A compensating method of image data, comprising:

calculating a polarity accumulation time of a positive polarity and a negative polarity of the image data; and determining whether to compensate a voltage polarity of the image data according to the polarity accumulation time, wherein the step of determining whether to compensate the voltage polarity of the image data according to the polarity accumulation time comprising:

when the polarity accumulation time is larger than a first threshold value, compensating the voltage polarity of the image data in a first polarity pattern; and when the polarity accumulation time is smaller than a second threshold value, compensating the voltage polarity of the image data in a second polarity pattern, wherein the second threshold value is smaller than the first threshold value.

2. The compensating method of the image data according to claim 1, wherein each of the first polarity pattern and the second polarity pattern has time length of odd frames.

3. The compensating method of the image data according to claim 2, wherein the first polarity pattern comprises at least two frames of the negative polarity.

4. The compensating method of the image data according to claim 2, wherein the second polarity pattern comprises at least two frames of the positive polarity.

5. The compensating method of the image data according to claim 1, further comprising:

when the polarity accumulation time is between the first threshold value and the second threshold value, stop compensating the voltage polarity of the image data.

6. The compensating method of the image data according to claim 1, wherein the polarity accumulation time of the positive polarity and the negative polarity of the image data is calculated every even frames before compensation.

7. The compensating method of the image data according to claim 1, wherein the polarity accumulation time of the positive polarity and the negative polarity of the image data is calculated every odd frames after compensation until the compensation is ended.

8. The compensating method of the image data according to claim 1, wherein the step of determining whether to compensate the voltage polarity of the image data according to the polarity accumulation time comprising:

when the polarity accumulation time is smaller than or equal to the first threshold value, not compensating the voltage polarity of the image data; and when the polarity accumulation time is larger than or equal to the second threshold value, not compensating the voltage polarity of the image data.

9. The compensating method of the image data according to claim 1, wherein the polarity accumulation time indicates a time difference of the positive polarity and the negative polarity of the image data.

10. A display apparatus, comprising:

a display panel, configured to display images according to image data; and a driver circuit, coupled to the display panel, and configured to output the image data to drive the display panel to display the images, wherein the driver circuit is further configured to calculate a polarity accumulation time of a positive polarity and a negative polarity of the image data, and determine whether to compensate a voltage polarity of the image data according to the polarity accumulation time, wherein when the polarity accumulation time is larger than a first threshold value, the driver circuit compensates the voltage polarity of the image data in a first polarity pattern; and when the polarity accumulation time is smaller than a second threshold value, the driver circuit compensates the voltage polarity of the image data in a second polarity pattern, wherein the second threshold value is smaller than the first threshold value.

11. The display apparatus according to claim 10, wherein each of the first polarity pattern and the second polarity pattern has time length of odd frames.

12. The display apparatus according to claim 11, wherein the first polarity pattern comprises at least two frames of the negative polarity.

13. The display apparatus according to claim 11, wherein the second polarity pattern comprises at least two frames of the positive polarity.

14. The display apparatus according to claim 10, wherein when the polarity accumulation time is between the first threshold value and the second threshold value, the driver circuit stops compensating the voltage polarity of the image data.

15. The display apparatus according to claim 10, wherein the driver circuit calculates the polarity accumulation time of the positive polarity and the negative polarity of the image data every even frames before compensation.

16. The display apparatus according to claim 10, wherein the driver circuit calculates the polarity accumulation time of the positive polarity and the negative polarity of the image data every odd frames after compensation until the compensation is ended.

17. The display apparatus according to claim 10, wherein when the polarity accumulation time is smaller than or equal to the first threshold value, the driver circuit does not compensate the voltage polarity of the image data; and when the polarity accumulation time is larger than or equal to the second threshold value, the driver circuit does not compensate the voltage polarity of the image data.

18. The display apparatus according to claim 10, wherein the polarity accumulation time indicates a time difference of the positive polarity and the negative polarity of the image data.

* * * * *